Aug. 27, 1940.  E. GERLACH  2,212,829
SWITCH WITH VISIBLE INDICATING MEANS
Filed Feb. 12, 1938
Fig. 1
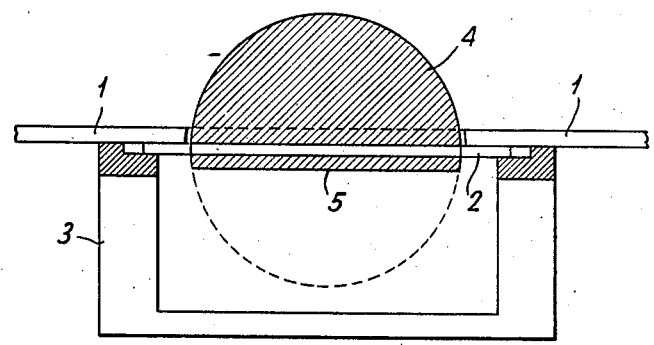
Fig. 2
Fig. 2a  Fig. 2b
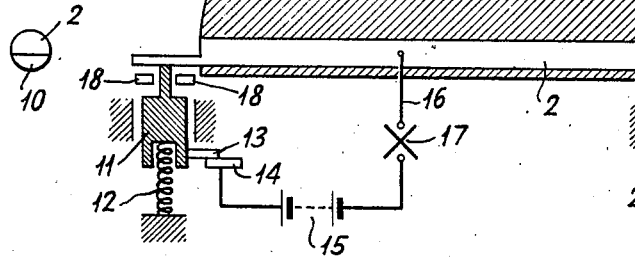 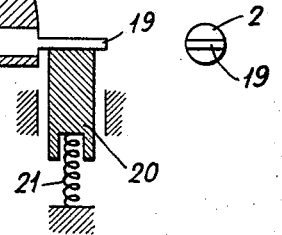
INVENTOR
ERWIN GERLACH
BY
ATTORNEY Patented Aug. 27, 1940

2,212,829

UNITED STATES PATENT OFFICE 2,212,829

SWITCH WITH VISIBLE INDICATING MEANS

Erwin Gerlach, Berlin-Siemensstadt, Germany, assignor to Telefunken Gesellschaft für Drahtlose Telegraphie m. b. H., Berlin, Germany, a corporation of Germany Application February 12, 1938, Serial No. 190,208
In Germany February 20, 1937

3 Claims. (Cl. 200—153)

The subject matter of the invention is a switch having a visible indicating means distinguished as compared with the customary indicating means in that it is visible within a space angle of more than 180 degrees.

In accordance with the invention this indicating means has a spacial configuration, more especially the shape of a half sphere which when the switch is on, protrudes out of the switch panel. The indicating means is at the same time adapted to serve as switch operating element. When the switch is off, the surface of the panel and the back of the indicating means form preferably a level surface. If instead of indicating the switch positions "on"—"off," two different circuits are to be switched alternatively, a complete sphere or a segmented complete sphere will be used whereby the two halves have different aspects for instance different colors.

The figure shows an example of construction of the subject matter of the invention. On the panel 1, a shaft 2 is arranged within a casing 3 containing the actual switch. In the switched-in position, the half sphere 4 protrudes as clearly visible indicating means out of the panel. To enhance the visibility, said half sphere may be painted with a bright color such as red. In the switched-off state, the half sphere 4 is turned down such as indicated by the dotted lines. The surface 5 then lies in the plane of the panel 1. This surface preferably has the color of the panel 1. It is advisable to indicate on this surface the direction of switching-in carried out by operating the visible indicating means.

The actual switch may be actuated either directly from the spacial indicating means, or, and this is more suitable, it may be operated from the shaft as shown in Figure 2. The shaft 2 is milled at one end whereby only the portion 10 is retained. With this part, the part 11 cooperates which is pressed against the part 10 by the force of the spring 12. The part 11 has fastened thereto the contact piece 13 which cooperates with the counter contact 14 connected to the current source 15. The shaft as well as the part 11 are insulated from the casing, said shaft being connected to the current source 15 across the line 16 and load 17. The figure shows the switched-in state. If the shaft is turned at 180 degrees and the visible indicating means has disappeared, the part 11 will be pressed against the limiting pieces 18 by the force of the spring 12. The contact 13, 14 is then opened without the part 11 undergoing any appreciable change from its switched-in state. At the other end of the shaft two millings have been carried out thereby retaining the portion 19. This extension 19 cooperates with a part 20 guided in like manner as the part 11, and which is pressed against said extension 19 by the spring 21. The extension 19 and the part 20 act as a rest.

In the example of construction the chosen shape of the visible indicating means is a half sphere. Obviously, the shape of the indicating means may be chosen as desired and also the structure of the switch, the essential feature is, that the indicating means preferably serves as such for operating the switch and that it is visible within a space angle of over 180 degrees.

The described switch having the visible indicating means is suited in particular for apparatus employed in the communication field such as, for instance, for condenser microphones serving for modulation arrangements.

I claim:

1. In a switching device, a housing including a panel having an opening therein, a rotatable shaft, a knob mounted on an intermediate portion of said shaft and so that the two ends of the shaft project beyond the knob, at least one of the ends of said shaft having a flattened portion, a pair of plungers mounted in said housing at approximately diametrically opposite points with respect to said opening, said shaft being positioned in said housing so that its two ends are held in position between the plungers and said panel, said plungers constituting a yielding journal section for the ends of said shaft and said panel a substantially unyielding journal section therefor, said flattened end of the shaft acting during rotation of the shaft to depress its associated plunger, and a switch controlled in accordance with the position of said plunger.

2. The arrangement described in the next preceding claim characterized by that both of said ends of the shaft are provided with a flattened portion, whereby each portion acts as a cam to operate its associated plunger.

3. In a switching device as described in claim 1 wherein the knob is provided with a substantially flat surface which in one position of the shaft is arranged to be substantially flush with the outer face of the panel, said knob being of such a size as to substantially close the opening in the panel in said position of the shaft and also in a position of the shaft which is 180° away from said last named position.

ERWIN GERLACH.